US008198396B2

(12) United States Patent
Angelopoulos et al.

(10) Patent No.: US 8,198,396 B2
(45) **Date of Patent: *Jun. 12, 2012**

(54) METHODS OF FABRICATING PLASTICIZED, ANTIPLASTICIZED AND CRYSTALLINE CONDUCTING POLYMERS AND PRECURSORS THEREOF

(75) Inventors: Marie Angelopoulos, Cortlandt Manor, NY (US); Yun-Hsin Liao, Tempe, AZ (US); Ravi F. Saraf, Blacksburg, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/583,030

(22) Filed: Aug. 12, 2009

(65) Prior Publication Data

US 2009/0304908 A1 Dec. 10, 2009

Related U.S. Application Data

(62) Division of application No. 09/346,353, filed on Jul. 2, 1999, now Pat. No. 7,902,323.

(51) Int. Cl.

| | |
|---|---|
| ***C08G 73/00*** | (2006.01) |
| ***C08G 73/20*** | (2006.01) |
| ***H01B 1/12*** | (2006.01) |
| ***C08F 6/10*** | (2006.01) |

(52) U.S. Cl. ........ 528/422; 528/480; 528/487; 528/491; 528/495; 528/497; 252/511

(58) Field of Classification Search .................. 528/480, 528/422, 487, 491, 495, 497; 252/511
See application file for complete search history.

(56) References Cited

U.S. PATENT DOCUMENTS

| | | | | |
|---|---|---|---|---|
| 5,232,631 | A * | 8/1993 | Cao et al. | 252/500 |
| 5,264,552 | A * | 11/1993 | Abe et al. | 528/422 |
| 5,290,483 | A * | 3/1994 | Kulkarni et al. | 252/500 |
| 5,403,913 | A * | 4/1995 | MacDiarmid et al. | 528/495 |
| 5,494,609 | A * | 2/1996 | Kulkarni et al. | 252/500 |
| 5,969,024 | A * | 10/1999 | Angelopoulos et al. | 524/261 |
| 6,806,349 | B2 * | 10/2004 | Angelopoulos et al. | 528/486 |
| 7,902,323 | B1 * | 3/2011 | Angelopoulos et al. | 528/480 |

* cited by examiner

*Primary Examiner* — Tae H Yoon
(74) *Attorney, Agent, or Firm* — Thomas A. Beck; Daniel P. Morris

(57) ABSTRACT

Methods of forming materials containing precursors to electrically conductive polymers and electrically conductive polymers are described which have a high degree of crystallinity. The high degree of crystallinity is achieved by preparing the materials under conditions which provide a high degree of mobility to the polymer molecules permitting them to associate with one another to form a crystalline state. High levels of electrical conductivity are achieved in in the electrically conductive materials without stretch orienting the material. The enhanced electrical conductivity is isotropic as compared to a stretch oriented film which has isotropic electrical conductivity. In the preferred embodiment, additives are added to a solution containing a solvent and the precursor or electrically conductive polymer. The additives are preferably plasticizer of diluents. As the solvent is removed the material dries and contains a higher degree of crystallinity than in the absence of the additive.

3 Claims, 8 Drawing Sheets

METHODS OF FABRICATING PLASTICIZED, ANTIPLASTICIZED AND CRYSTALLINE CONDUCTING POLYMERS AND PRECURSORS THEREOF

CROSS REFERENCE TO RELATED APPLICATION

U.S. Pat. No. 5,928,566 entitled, "PLASTICIZED, ANTI-PLASTICIZED AND CRYSTALLINE CONDUCTING POLYMERS AND PRECURSORS THEREOF" and U.S. Pat. No. 5,932,143 entitled, "POLYCRYSTALLINE CONDUCTING POLYMERS AND PRECURSORS THEREOF HAVING ADJUSTABLE MORPHOLOGY AND PROPERTIES," the teachings of which are incorporated herein by reference.

This application is a divisional application of application Ser. No. 09/346,353 filed Jul. 2, 1999, now U.S. Pat. No. 7,902,323, both of which claim priority from Provisional Application Ser. No. 60/007,688, filed Nov. 29, 1995.

FIELD OF THE INVENTION

The present invention is directed to methods of fabricating crystalline electrically conductive precursors and line electrically conductive polymers crystal.

BACKGROUND

Electrically conductive organic polymers emerged in the 1970's as a new class of electronic materials. These materials have the potential of combining the electronic and magnetic properties of metals with the light weight, processing advantages, and physical and mechanical properties characteristic of conventional organic polymers. Examples of electrically conducting polymers are polyparaphenylene vinylenes, polyparaphenylenes, polyanilines, polytbiophenes, polyazines, polyfuranes, polythianaphthenes polypyrroles, polyselenophenes, poly-p-phenylene sulfides, polyacetylenes formed from soluble precursors, combinations thereof and blends thereof with other polymers and copolymers of the monomers thereof.

These polymers are conjugated systems which are made electrically conducting by doping. The doping reaction can involve an oxidation, a reduction, a protonation, an alkylation, etc. The non-doped or non-conducting form of the polymer is referred to herein as the precursor to the electrically conducting polymer. The doped or conducting form of the polymer is referred to herein as the "conducting polymer."

Conducting polymers have potential for a large number of applications in such areas such as electrostatic charge/discharge (ESC/ESD) protection, electromagnetic interference (EMI) shielding, resists, electroplating, corrosion protection of metals, and ultimately metal replacements, i.e. wiring, plastic microcircuits, conducting pastes for various interconnection technologies (solder alternative), etc. Many of the above applications especially those requiring high current capacity have not yet been realized because the conductivity of the processible conducting polymers is not yet adequate for such applications.

To date, polyacetylene exhibits the highest conductivity of all the conducting polymers. The reason for this is that polyacetylene can be synthesized in a highly crystalline form (crystallinity as high as 90% has been achieved) (as reported in Macromolecules, 25, 4106, 1992). This highly crystalline polyacetylene has a conductivity on the order of $10^5$ S/cm. Although this conductivity is comparable to that of copper, polyacetylene is not technologically applicable because it is a non-soluble, non-processible, and environmentally unstable polymer.

The polyaniline class of conducting polymers has been shown to be probably the most suited of such materials for commercial applications. Great strides have been made in making the material quite processable. It is environmentally stable and allows chemical flexibility which in turn allows tailoring of its properties. Polyaniline coatings have been developed and commercialized for numerous applications. Devices and batteries have also been constructed with this material. However, the conductivity of this class of polymers is generally on the low end of the metallic regime. The conductivity is on the order of 100 S/cm. Some of the other soluble conducting polymers such as the polythiophenes, poly-para-phenylenevinylenes exhibit conductivity on the order of $10^2$ S/cm. It is therefore desirable to increase the conductivity of the soluble/processible conducting polymers, in particular the polyaniline materials.

The conductivity ($\sigma$) is dependent on the number of carriers (n) set by the doping level, the charge on the carriers (q) and on the interchain and intrachain mobility ($\mu$) of the carriers.

$$\sigma=nq\mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on the degree of conjugation along the chain, presence of defects, and on the chain conformation. The interchain mobility depends on the interchain interactions, the interchain distance, the degree of crystallinity, etc. Increasing the crystallinity results in increased conductivity as exemplified by polyacetylene. To date, it has proven quite difficult to attain polyaniline in a highly crystalline state. Some crystallinity has been achieved by stretch orientation or mechanical deformation (A. G. MacDiamid et al in Synth. Met. 55-57, 753). In these stretch-oriented systems, conductivity enhancements have been observed. The conductivity enhancement was generally that measured parallel to the stretch direction. Therefore, the conductivity in these systems is anisotropic. It is desirable to achieve a method of controlling and tuning the morphology of polyaniline. It is desirable to achieve a method of controlling and tuning the degree of crystallinity and the degree of amorphous regions in polyaniline, which in turn provides a method of tuning the physical, mechanical, and electrical properties of polyaniline. It is further desirable to achieve highly crystalline and crystalline polyaniline and to achieve this in a simple and useful manner in order to increase the mobility of the carriers and, therefore, the conductivity of the polymer. It is also further desirable to achieve isotropic conductivity, that is conductivity not dependent on direction as with stretch-oriented polyanilines.

OBJECTS

It is an object of the present invention to provide a method to fabricate electrically conducting polymer precursors and electrically conducting polymers having adjustable morphology.

It is an object of the present invention to provide a method to fabricate electrically conducting polymer precursors and electrically conducting polymers in which the degree of crystalline regions and the degree of amorphous regions is adjustable.

It is an object of the present invention to provide a method to fabricate electrically conducting polymer precursors and electrically conducting polymers having adjustable physical, mechanical, and electrical properties.

It is an object of the present invention to provide a method to fabricate a crystalline electrically conducting polymer precursor and crystalline conducting polymers.

It is another object of the present invention to provide a method to fabricate highly crystalline conducting polymer precursor and crystalline conducting polymers.

It is another object of the present invention to provide a method to fabricate an electrically conducting polymer that exhibits enhanced carrier mobility.

It is another object of the present invention to provide a method to fabricate an electrically conducting polymer which exhibits enhanced conductivity.

It is another object of the present invention to provide a method to fabricate an electrically conducting polymer which exhibits enhanced isotropic conductivity.

It is another object of the present invention to provide a method to induce a plasticization effect in electrically conducting polymer precursors and electrically conducting polymers.

It is another object of the present invention to provide a method to fabricate an antiplasticization effect in electrically conducting polymer precursors and electrically conducting polymers.

It is another object of the present invention to add an additive to a precursor or an electrically conductive polymer to induce enhanced mobility.

It is another object of the present invention to add an additive to a precursor or an electrically conductive polymer to induce an enhanced degree of crystallinity.

It is another object of the present invention to provide a method to fabricate a precursor or electrically conductive polymer which has an enhanced degree of crystallinity without being stretch oriented.

It is another object of the present invention to provide a method to fabricate a precursor or electrically conductive polymer which has increased glass transition temperature.

It is another object of the present invention to provide a method to fabricate a precursor or electrically conductive polymer which has decreased glass transition temperature.

It is another object of the present invention to provide a method to fabricate a precursor or electrically conductive polymer which has enhanced mechanical properties.

It is another object of the present invention to provide a method to fabricate a precursor or electrically conductive polymer which has decreased mechanical properties.

SUMMARY OF THE INVENTION

A broad aspect of the present invention is a method of forming an admixture of a solvent, an additive and a polymer selected from the group consisting of a precursor to an electrically conductive polymer and a electrically conductive polymer wherein the solvent is removed or partially removed and the additive provides local mobility to the polymer to allow the polymer chains to tightly associate with one another to achieve a high crystalline state.

In a more particular aspect of the present invention is a method of forming an admixture of a solvent, an additive and a polymer selected from the group consisting of a precursor to an electrically conductive polymer and an electrically conductive polymer wherein the solvent is removed or partly removed and the additive provides a plasticization effect.

In a more particular aspect of the present invention is a method of forming an admixture of a solvent, an additive and a polymer selected from the group consisting of a precursor to an electrically conductive polymer and an electrically conductive polymer wherein the solvent is removed or partly removed and the additive provides an antiplasticization effect.

BRIEF DESCRIPTION OF THE DRAWINGS

Further objects, features, and advantages of the present invention will become apparent from a consideration of the following detailed description of the invention when read in conjunction with the drawings FIG's. in which:

FIG. 5(*b*) is a Wide Angle X-Ray Scattering spectrum for a polyaniline base film that has been stretch oriented (l/lo=3.7). This film was derived from a gel. FIG. 5(*c*) is a Wide Angle X-Ray Scattering spectrum for a polyaniline base film containing 10% of a poly-co-dimethyl propylamine siloxane. This film is highly crystalline.

DETAILED DESCRIPTION

The present invention is directed toward electrically conducting polymer precursors and conducting polymers having adjustable morphology and in turn adjustable physical, mechanical, and electrical properties. The present invention is also directed toward controlling and enhancing the 3-dimensional order or crystallinity of conducting polymer precursors and of conducting polymers. In addition, the present invention is directed towards enhancing the electrical conductivity of conducting polymers. This is done by forming an admixture of an electrically conducting polymer precursor or an electrically conducting polymer with an additive whereby the additive provides local mobility to the molecules so as to allow the conducting polymer precursor or conducting polymer chains to associate with one another and achieve a highly crystalline state. An example of such an additive is a plasticizer. A plasticizer is a substance which when added to a polymer, solvates the polymer and increases its flexibility, deformability, generally decreases the glass transition temperature Tg, and generally reduces the tensile modulus. In certain cases, the addition of a plasticizer may induce anti-plasticization, that is an increase in the modulus or stiffness of the polymer, an increase in Tg. Herein the additives can provide a plasticization effect, an antiplasticization effect or both effects.

Figure 1:
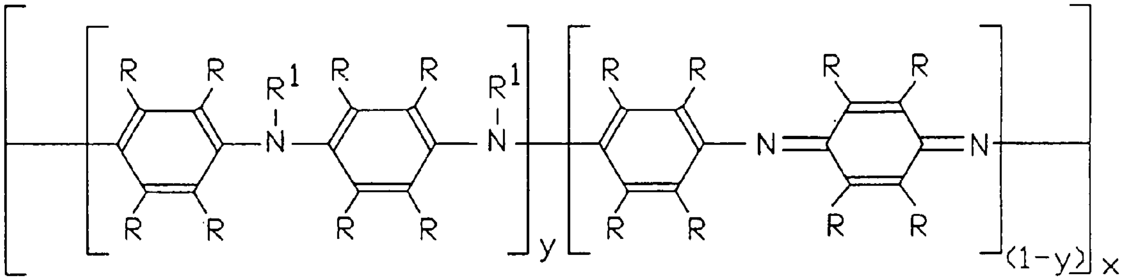
FIG. 1 is a general formula for polyaniline in the non-doped or precursor form.

Examples of polymers which can be used to practice the present invention are of substituted and unsubstituted homopolymers and copolymers of aniline, thiophene, pyrrole, p-phenylene sulfide, azines, selenophenes, furans, thianaphthenes, phenylene vinylene, etc. and the substituted and unsubstituted polymers, polyparaphenylenes, polyparaphenylevevinylenes, polyanilines, polyazines, polythiophenes, poly-p-phenylene sulfides, polyfuranes, polypyrroles, polythianaphthenes, polyselenophenes, polyacetylenes formed from soluble precursors and combinations thereof and copolymers of monomers thereof. The general formula for these polymers can be found in U.S. Pat. No. 5,198,153 to Angelopoulos et al. While the present invention will be described with reference to a preferred embodiment, it is not limited thereto. It will be readily apparent to a person of skill in the art how to extend the teaching herein to other embodiments. One type of polymer which is useful to practice the present invention is a substituted or unsubstituted polyaniline or copolymers of polyaniline having general formula shown in FIG. 1 wherein each R can be H or any organic or inorganic radical; each R can be the same or different; wherein each $R^1$ can be H or any organic or inorganic radical, each $R^1$ can be the same or different; $x \geqq 1$; preferable $x \geqq 2$ and y has a value from 0 to 1. Examples of organic radicals are alkyl or aryl radicals. Examples of inorganic radicals are Si and Ge. This list is exemplary only and not limiting. The most preferred embodiment is emeraldine base form of the polyaniline wherein y has a value of approximately 0.5. The base form is the non-doped form of the polymer. The non-doped form of polyaniline and the non-doped form of the other conducting polymers is herein referred to as the electrically conducting polymer precursor.

Figure 2:
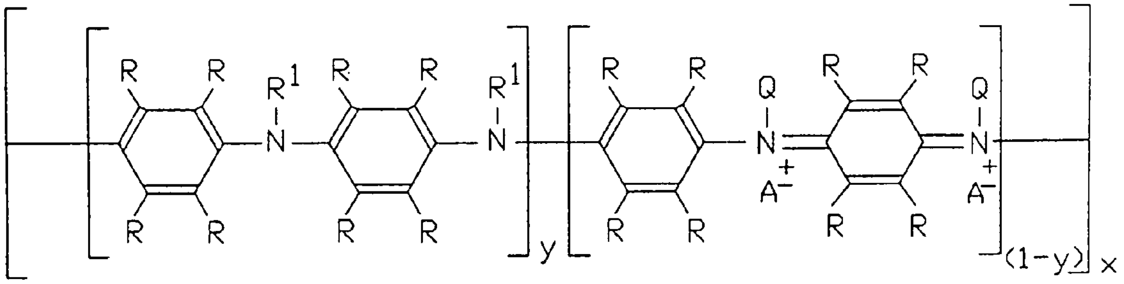
FIG. 2 is a general formula for a doped conducting polyaniline.

In FIG. 2, polyaniline is shown doped with a dopant. In this form, the polymer is in the conducting form. If the polyaniline base is exposed to cationic species QA, the nitrogen atoms of the imine (electron rich) part of the polymer becomes substituted with the Q+ cation to form an emeraldine salt as shown in FIG. 2. Q+ can be selected from H+ and organic or inorganic cations, for example, an alkyl group or a metal.

Figure 3:
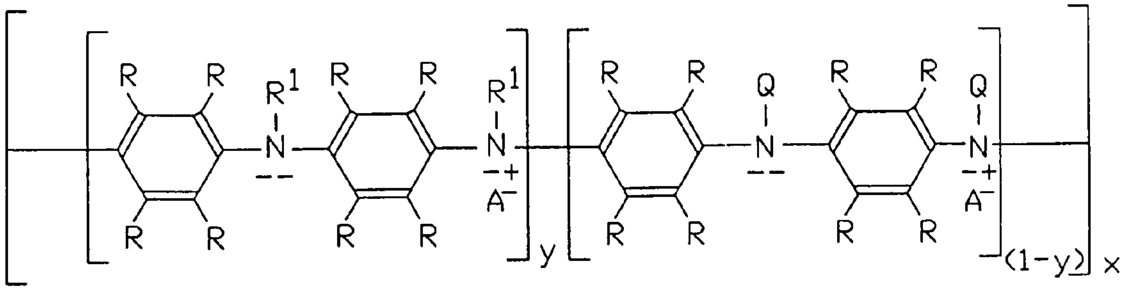
FIG. 3 is a general formula for the polysemiquinone radical cation form of doped conducting polyaniline.

QA can be a protic acid where Q is hydrogen. When a protic acid, HA, is used to dope the polyaniline, the nitrogen atoms of the imine part of the polyaniline are protonated. The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 3.

The emeraldine base form of polyaniline is soluble in various organic solvents and in various aqueous acid solutions. Examples of organic solvents are dimethylsulfoxide (DMSO), dimethylformamide (DMF) and N-methylpyrrolidinone NP), dimethylene propylene urea, tetramethyl urea, pyridine, toluene, xylene, m-cresol, phenol, dimethylacetamide, n-cyclohexylpyrrolidinone, aqueous acetic acid, aqueous formic acid, pyrrolidinone, N1N' dimethyl propylene urea (DMPU), benzyl alcohol and water, etc.

This list is exemplary only and not limiting. Examples of aqueous acid solutions is 80% acetic acid and 60-88% formic acid. This list is exemplary only and not limiting.

Figure 4:
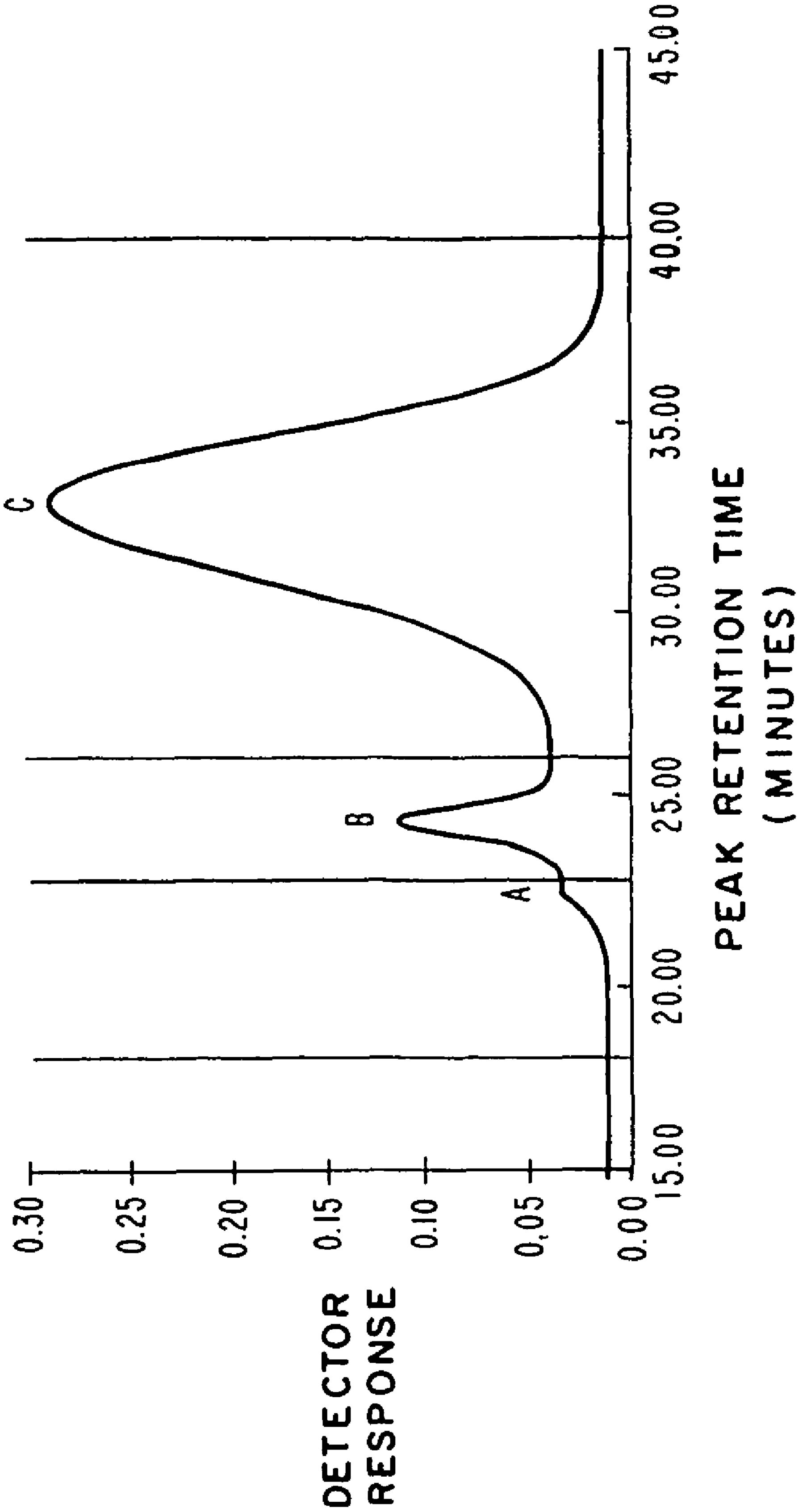
FIG. 4 is a Gel Permeation Chromatograph (GPC) of polyaniline base in NMP (0.1%). GPC shows a trimodal distribution—A very high molecular weight fraction (approx. 12%) and a major peak having lower molecular weight.

Polyaniline base is generally processed by dissolving the polymer in NMP. These solutions exhibit a bimodal or trimodal distribution in Gel Permeation Chromatography (GPC) as a result of aggregation induced by internal hydrogen bonding between chains as previously described in U.S. patent application Ser. No. 08/370,128, filed on Jan. 9, 1995, the teaching of which is incorporated herein by reference. The GPC curve for typical polyaniline base in NMP is shown in FIG. 4.

Polymers in general can be amorphous, crystalline, or partly crystalline. In the latter case, the polymer consists of crystalline phases and amorphous phases. The morphology of a polymer is very important in determining the polymer's physical, mechanical, and electronic properties.

Figure 5:
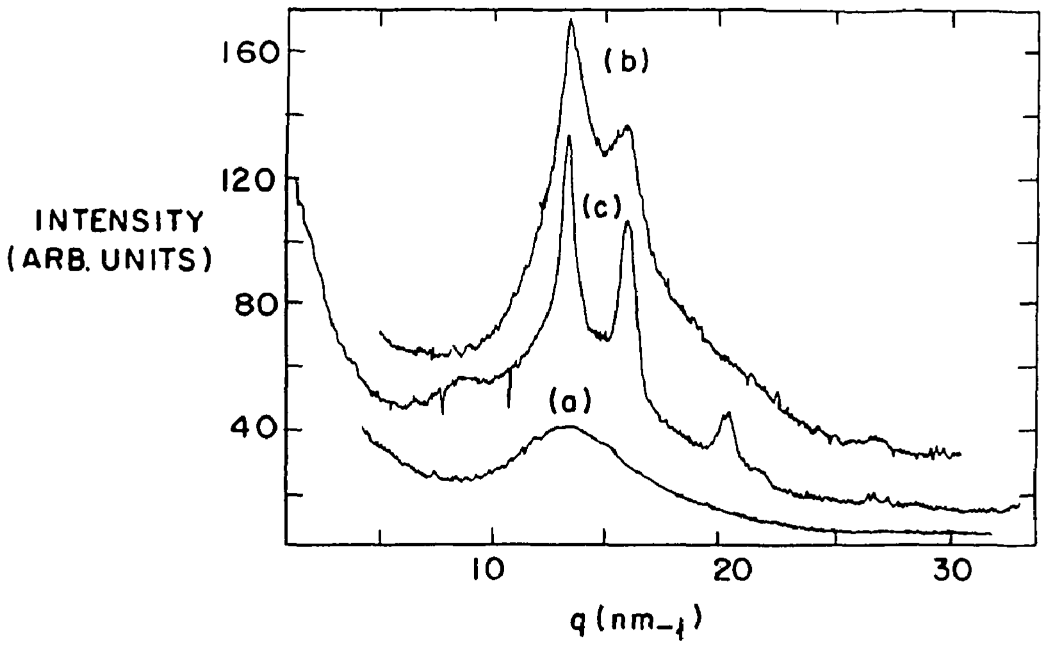
FIG. 5(*a*) is a Wide Angle X-Ray Scattering (WAXS) spectrum for a polyaniline base film processed from NMP. The polymer film is essentially amorphous.

Polyaniline base films processed from NMP either by spin-coating or by solution casting techniques are amorphous as can be seen in FIG. 5*a* which depicts the Wide Angle X-Ray Scattering (WAXS) spectrum for this material. Amorphous diffuse scattering is observed. Some crystallinity is induced in these films by post processing mechanical deformation especially if these films are derived from gels as described by A. G. MacDiamid et al in Synth. Met. 55-57, 753 (1993). WAXS of a stretch oriented film having been stretched (l/lo=3.7×) derived from a gel is shown in FIG. 5*b*. Some crystallinity has been induced as compared to the non-stretch oriented films as evidenced by the defined scattering peaks.

Doping the amorphous polyaniline base films (those having structure shown in FIG. 5*a*) with aqueous hydrochloric acid results in isotropic conductivity of 1 S/cm. Such films are not crystalline. Similar doping of stretch oriented films results in anisotropic conductivity where conductivity on the order of $10^2$ S/cm is measured parallel to the stretch direction whereas conductivity on the order of $10^0$ S/cm is measured perpendicular to the stretch direction. It should also be noted that some level of crystallinity is lost during the doping process in these films.

According to the present invention, the interchain (polymer chain) registration is increased as compared to a stretch oriented film.

Figure 7:
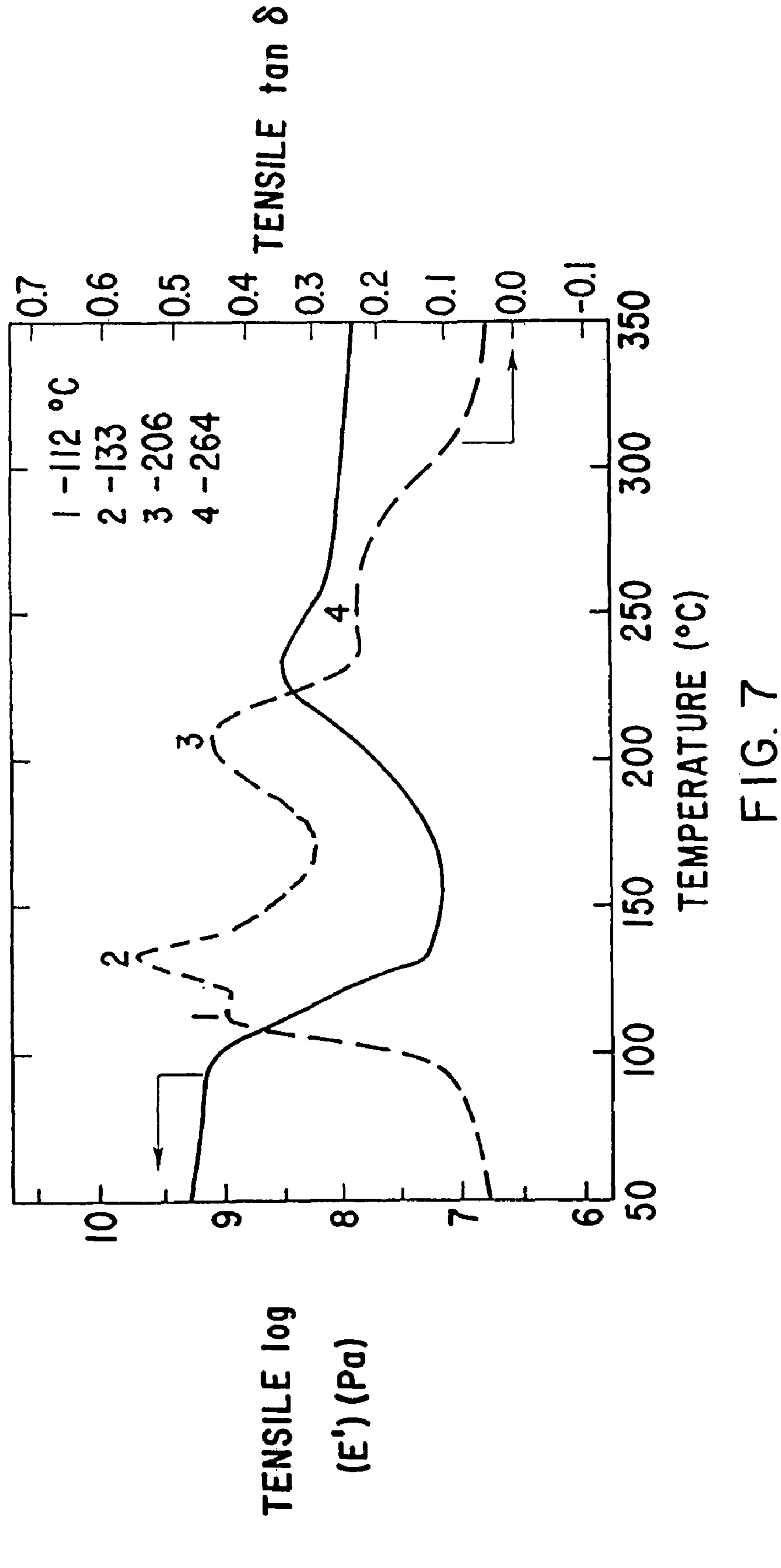
FIG. 7 is a Dynamic Mechanical Thermal Analysis (DMTA) plot for polyaniline base film cast from NMP. (First Thermal Scan; under Nitrogen)
Figure 8:
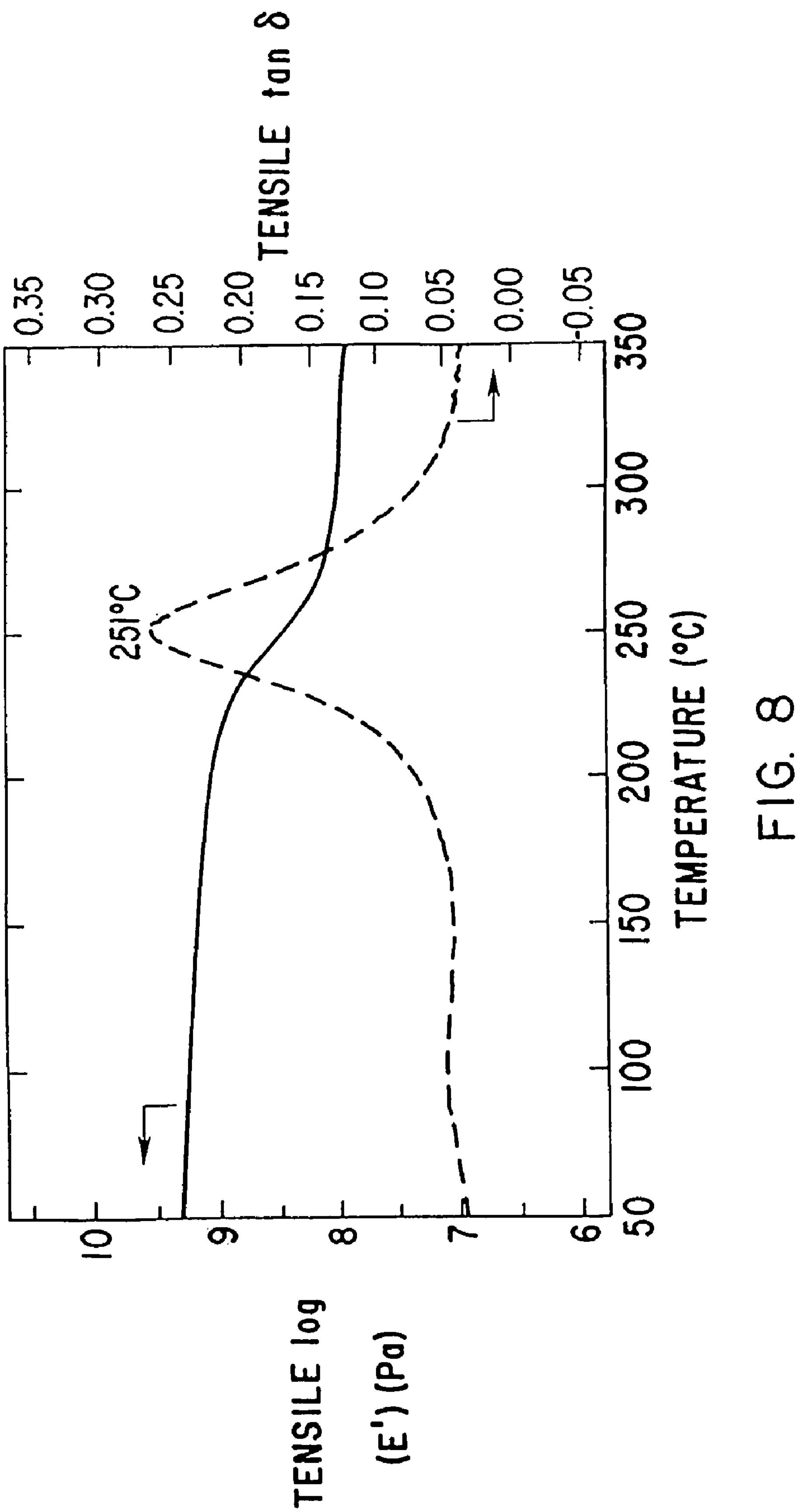
FIG. 8 is a DMTA plot which represents the second thermal scan for a polyaniline base film cast from NMP; This same film was previously scanned as shown in FIG. 7. Film contains no residual solvent.

FIGS. 7 and 8 show the dynamic mechanical thermal analysis (DMTA) spectrum for a polyaniline base film processed from NMP alone. FIG. 7 is the first scan where a Tg of approx. 118 is observed as a result of the residual NMP which is present in the film. FIG. 8 is the second thermal scan of the same film. This film has no residual solvent and a Tg of ≈251° C. is measured for the polyaniline base polymer.

Figure 9:
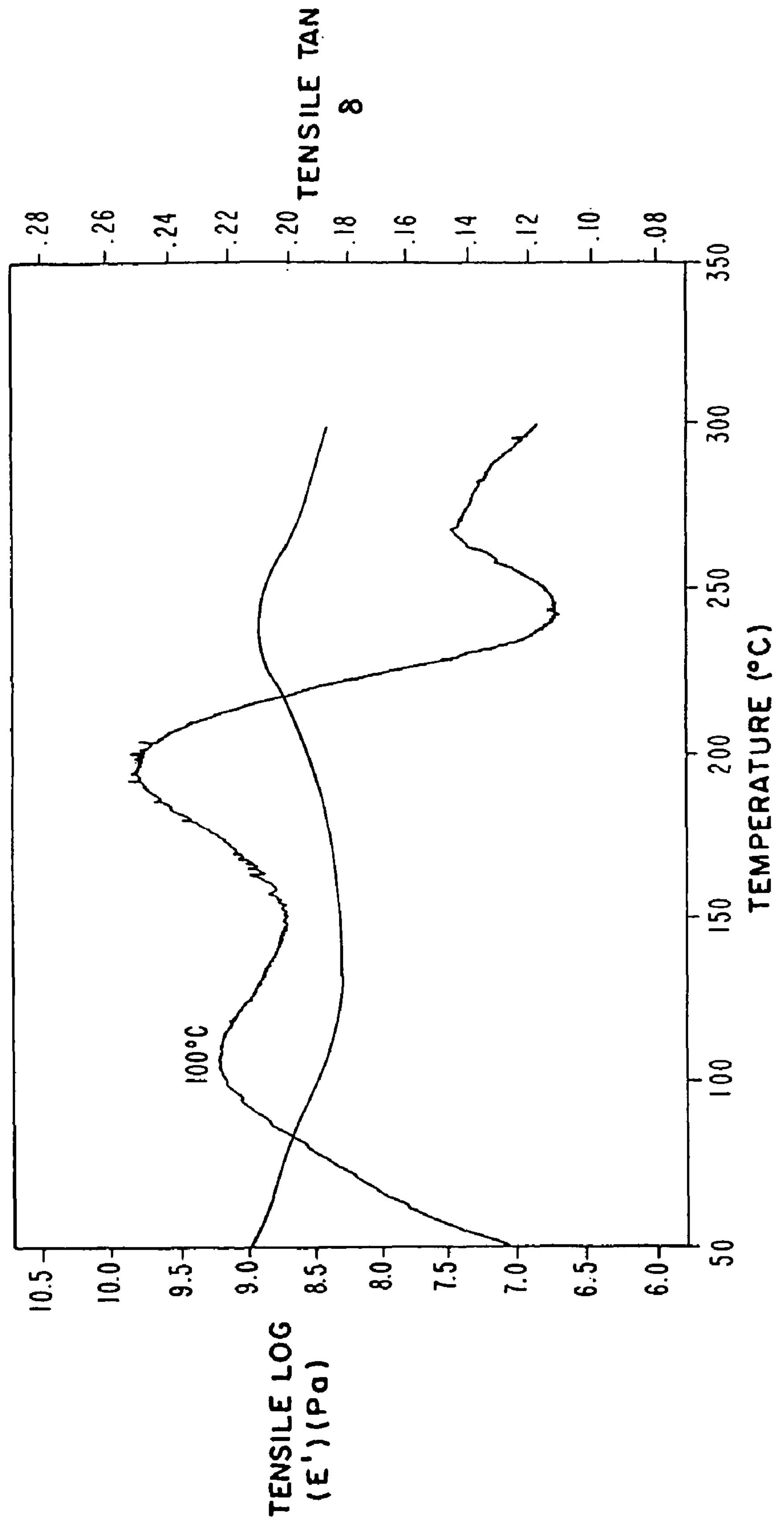
FIG. 9 is a DMTA plot for a polyaniline base film cast from NMP and containing 5% poly-co-dimethyl aminopropyl siloxane (5% N content). First thermal scan.
Figure 10:
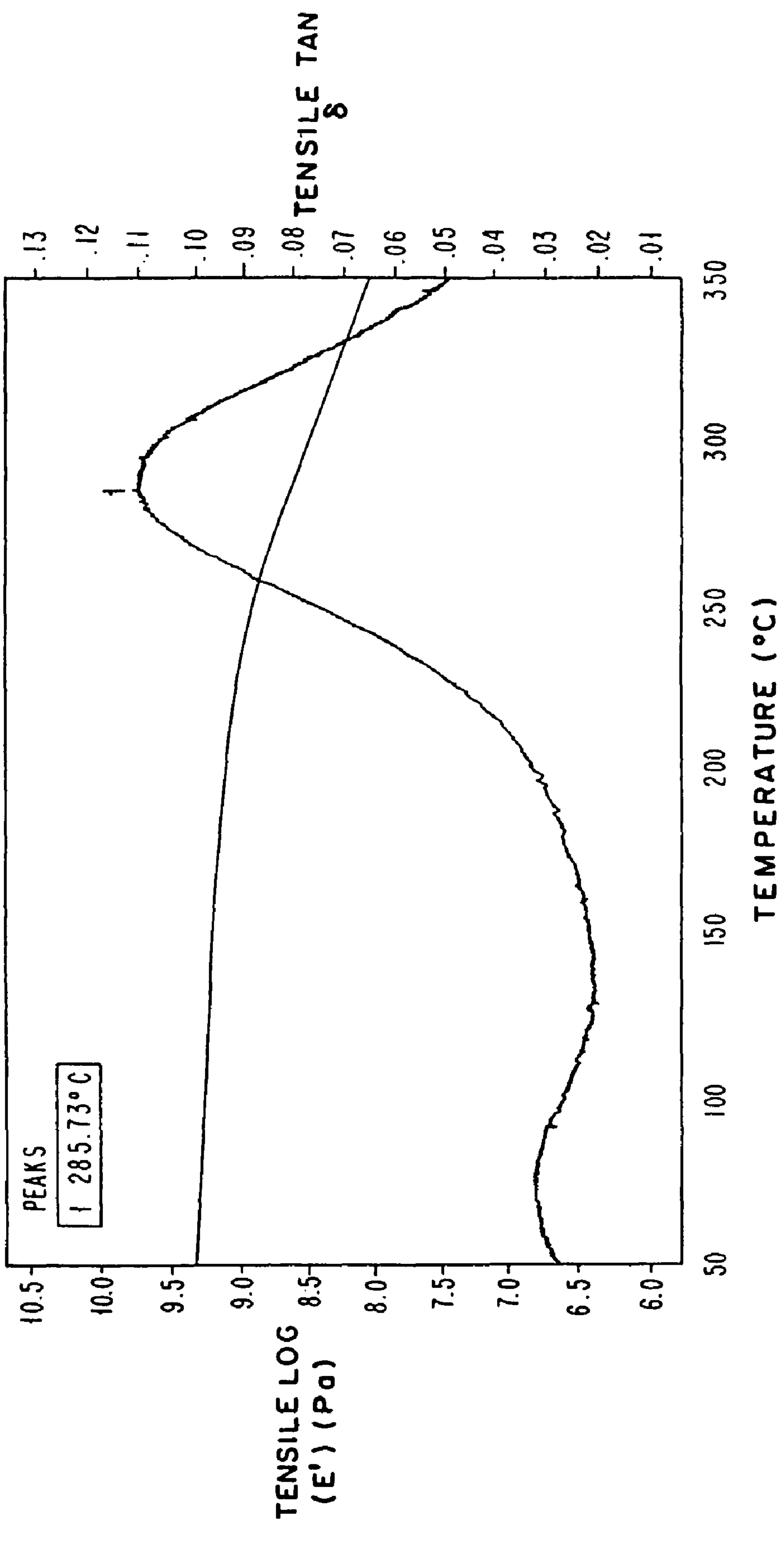
FIG. 10 is a DMTA plot for a polyaniline base film cast from NMP and containing 5% poly-co-dimethyl aminopropyl siloxane (5% N content). Second Thermal Scan (this same film was previously scanned as shown in FIG. 9) Film contains no residual solvent.
Figure 11:
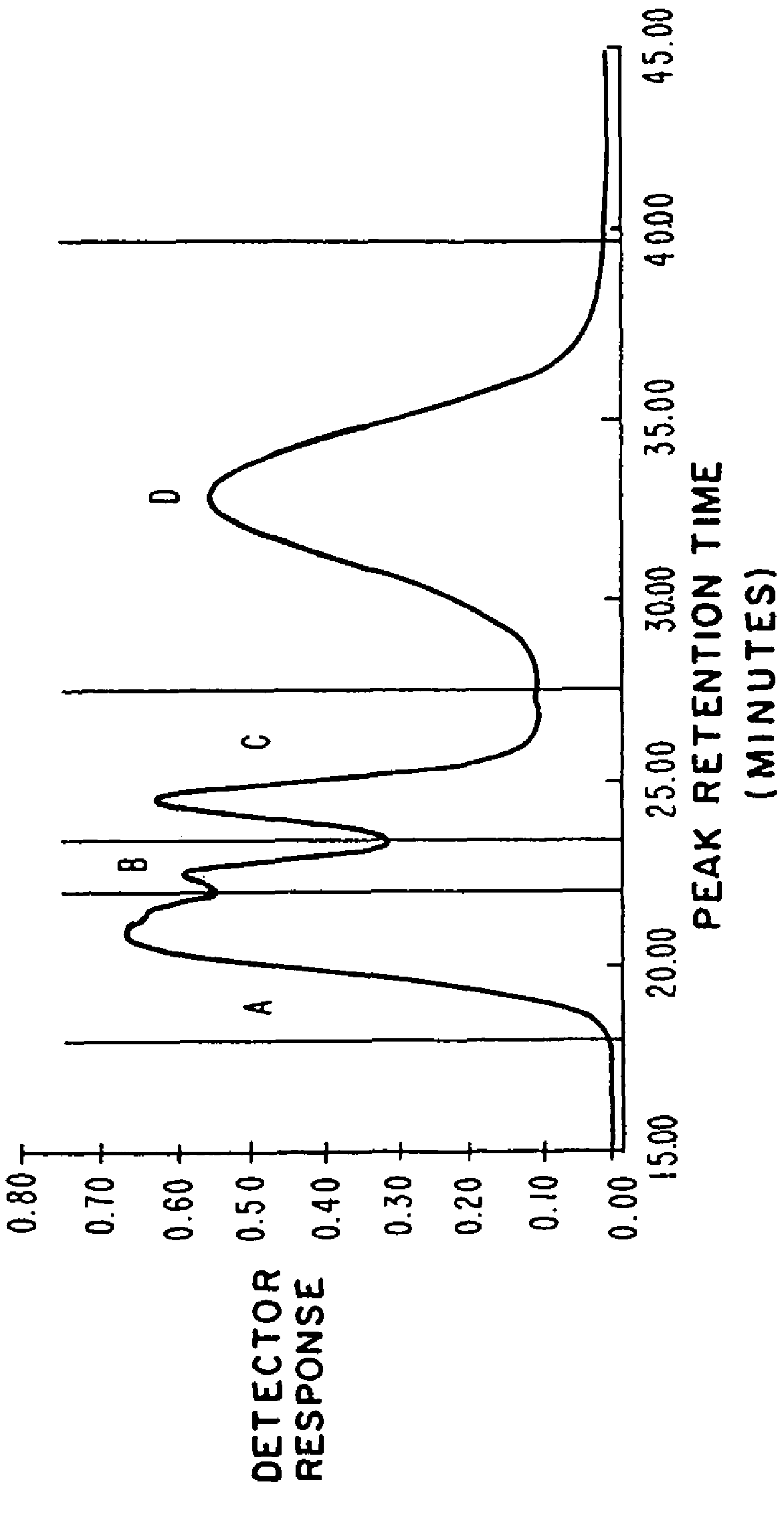
FIG. 11 is a GPC for a polyaniline base solution in NMP containing 5% poly-co-dimethyl aminopropyl siloxane by weight to polyaniline. The polyaniline was 0.1% in NMP.

When an additive such as a plasticizer, such as a poly-co-dimethyl propylamine siloxane, is added to the polyaniline base completely different properties and morphology is observed. The siloxane has a polar amine group which facilitates the miscibility of the polyaniline base and the plasticizer. The DMTA of a polyaniline base film cast from NMP and containing 5% by weight to polyaniline of the poly-co-dimethyl propyl amine siloxane exhibits a lower Tg on the first thermal scan as compared to polyaniline base processed from NMP alone (FIG. 9) as a result of plasticization induced by the siloxane. However, on the second thermal scan of this film (FIG. 10), the polymer exhibits an increase in Tg as compared to polyaniline processed from NMP. When the polysiloxane is added to a solution of polyaniline base, the siloxane due to the polar amine group can interact with the polymer chains and disrupt some of the polyaniline interactions with itself or some of the aggregation. Thus, the polysiloxane first induces some deaggregation. However, the polysiloxane has multiple amine sites and thus, it can itself hydrogen bond with multiple polyaniline base chains and thus, the polysiloxane facilitates the formation of a cross-linked network. This cross-linked network accounts for the increased Tg observed in the DMTA. Tg is characteristic of the amorphous regions of a polymer and in this case the amorphous regions consist of a cross-linked polyaniline/polysiloxane network. Thus, the polysiloxane is inducing an antiplasticization effect in polyaniline base as the Tg is increased. Generally, plasticizers reduce Tg. GPC data (FIG. 11) is consistent with this model. The addition of the poly-amino containing siloxane to a polyaniline base solution in NMP results in a significant increase in the high molecular weight fractions depicting the cross-linked network which forms between polyaniline and the plasticizer.

In addition to the cross-linked network the siloxane induces in the amorphous regions, concomittantly it also is found to induce significant levels of crystallinity in polyaniline base as a result of the local mobility that it provides. FIG. 5*c* shows the WAXS for a polyaniline base film processed from NMP containing 10% of the poly amino containing siloxane. As can be seen highly crystalline polyaniline has been attained. Much higher levels of crystallinity as compared to FIG. 5*b* for the stretch oriented films.

Figure 6:
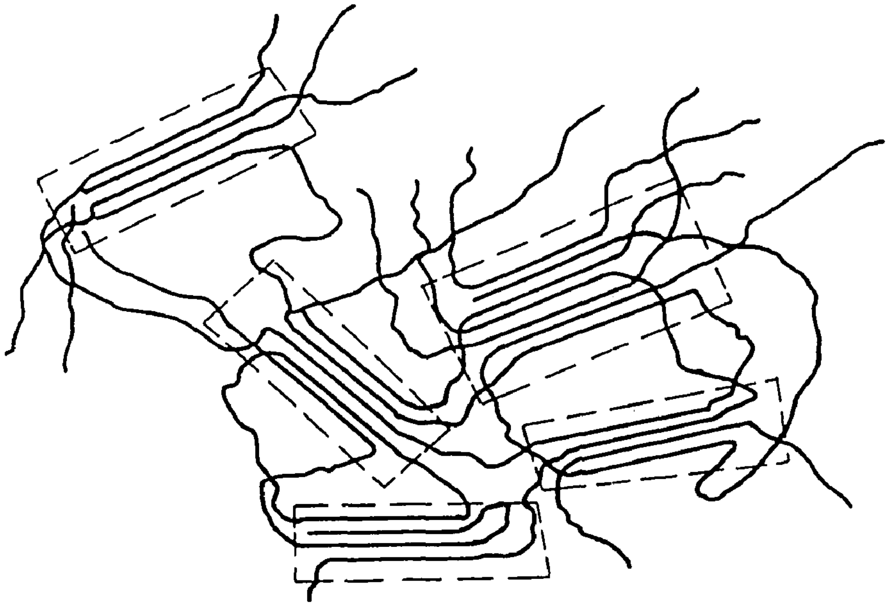
FIG. 6 is a schematic diagram of a polycrystalline material as taught in the present invention having crystalline regions (outlined in dotted rectangles) with interstitial amorphous regions.

Thus polyaniline by the addition of the siloxane forms a structure depicted in FIG. 6 where crystalline regions of highly associated polyaniline chains (outlined by a rectangle) are formed with intersticial amorphous regions. In most cases, the additive resides in the amorphous intersticial sites. The degree of crystallinity (number of crystalline sites) and the size of the crystalline domains as well as the degree of amorphous regions and the nature of the amorphous region (aggregated, i.e. cross-linked or not) can be tuned by the type and amount of additive. In turn, by controlling the above, the properties of the material can also be controlled.

With the poly-co-dimethyl aminopropyl siloxane (5% N content), loadings ranging from 0.001 to 20% by weight gives highly crystalline polyaniline. The highly crystalline polyaniline in turn exhibits increased modulus, stiffness, yield and tensile strengths, hardness, density and softening points. Thus, the siloxane at these loadings is having an antiplasticization effect. Above 20% loading, the crystallinity begins to decrease. As the crystallinity decreases, the modulus, stiffness, yield and tensile strengths, hardness, density and softening points begin to decrease. Thus, the siloxane at these loadings begins to have a plasticization effect. The siloxane content becomes high enough that it disrupts the polyaniline base interactions in the crystalline regions. With the poly co dimethyl aminopropyl siloxanes having 0.5 and 13% N ratios, similar trends are observed but the particular amount of siloxane needed to have a plasticization effect or an antiplasticization effect varies. Thus, the degree of crystallinity and the degree of amorphous regions and in turn the properties of polyaniline can be tuned by the nature of the additive as well as the amount of additive. Indeed, using the same additive but simply changing the loading dramatically changes the morphology and in turn the properties of polyaniline.

The electronic properties of the polymer are also impacted. The conductivity of a polyaniline base film cast from NMP and containing 1% by weight poly-co-dimethyl aminopropyl siloxane which is doped by aqueous hydrochloric acid is 50 S/cm as compared to 1 S/cm for a polyaniline film with no plasticizer. This is isotropic conductivity. The doped film containing the polysiloxane retains the highly crystalline structure.

The degree of crystallinity and the degree of amorphous regions and in turn the physical, mechanical, and electronic properties can be tuned by the particular additive used and by the amount of additive. For example, the Tg of polyaniline can be increased or decreased by the amount and type of additive. The mechanical properties such as tensile properties, modulus, impact resistance, etc. can be tuned as described above. The additive can range from 0.001 to 90% by weight, more preferably from 0.001 to 50% and most preferably from 0.001 to 25%. A list of plasticizers that can be used to practice the present invention is given in Table 1. The plasticizer can be small molecules, oligomeric or polymeric in nature as can be seen in Table 1. They can be monofuntional, bifunctional, and multifunctional. The additive can also be removed from the final film structure if so desired by appropriate extraction.

SPECIFIC EXAMPLES

Polyaniline Synthesis Polyaniline is synthesized by the oxidative polymerization of aniline using ammonium peroxydisulfate in aqueous hydrochloric acid. The polyaniline hydrochloride precipitates from solution. The polymer is then neutralized using aquoeous ammonium hydroxide. The neutralized or non-dope polyaniline base is then filtered, washed and dried. Polyaniline can also be made by electrochemical oxidative polymerization as taught by W. Huang, B. Humphrey, and A. G. MacDiamid, J. Chem. Soc., Faraday Trans. 1, 82, 2385, 1986.

Polyaniline Base in NMF: The polyaniline base powder is readily dissolved in NMP up to 5% solids. Thin films (on the order of a micron) can be formed by spin-coating. Thick films are made by solution casting and drying (70° C. in vacuum oven under a nitrogen purge for 15 hours). These solutions and films have the properties described above.

Polyaniline Base in NMP/Plasticizer a. Polyaniline Base was first dissolved in NMP to 5% solids and allowed to mix well. A poly-co-dimethyl, aminopropyl siloxane (N content 5% relative to repeat unit) was dissolved to 5% in NMP. The siloxane solution was added to the polyaniline base solution. The resulting admixture was allowed to mix for 12 hours at room temperature. A number of solutions were made having from 0.001% to 50% siloxane content (by weight relative to polyaniline). Thin films were spin-coated onto quartz substrates; Thick films were prepared by solution casting and baking the solutions at 70° C. in a vacuum oven under a Nitrogen purge for 15 hours). The solutions and the films have the properties described above.

b. The same experiment described in (a) was carried out except that the plasticizer was a poly-co-dimethyl, aminopropyl siloxane in which the N content was 13%.

c. The same experiment described in (a) was carried out except that the plasticizer was a poly-co-dimethyl, aminopropyl siloxane in which the N content was 0.5%.

d. The same experiment described in (a) was carried out except that the plasticizer was polyglycol diacid.

e. The same experiment described in (a) was carried out except that the plasticizer was 3,6,9-trioxaundecanedioic acid.

f. The same experiment described in (a) was carried out except that the plasticizer was poly(ethylene glycol) tetrahydro furfuryl ether.

g. The same experiment described in (a) was carried out except that the plasticizer was glycerol triacetate.

h. The same experiment described on (a) was carried out except the plasticizer was epoxidized soy bean oil.

Polyaniline Base in NMP/m-Cresol/Plasticizer

The same experiment as described in (a) was carried out except that polyaniline base and the plasticizer was dissolved in NMP/m-Cresol mixtures in which m-Cresol ranged from 1 to 99%

Polyaniline Base in m-Cresol/Plasticizer

The same experiment as described in (a) was carried out except that the polyaniline base was dissolved in m-Cresol and the plasticizer was dissolved in m-Cresol.

Polyaniline Base in m-Cresol and in NMP/m-Cresol

Polyaniline Base was dissolved in m-Cresol and in NMP/m-Cresol combinations to 5% solids. The m-Cresol in the latter system being the additive ranged from 1 to 99%. Free-Standing films were made by solution casting techniques. With increasing m-cresol content, the polyaniline exhibited a WAXS similar to that shown in FIG. 5*a* except that the amorphous scattering peak became somewhat sharper indicative of some crystallinity. However, this was significantly less than observed with the siloxane plasticizer.

Doped Polyanilines

1. Hydrochloric Acid and/or Methanesulfonic Acid Doped Films

Polyaniline base films made as described above were doped by aqueous acid solutions of hydrochloric or methanesulfonic acid. The films were immersed in the acid solution for 12 hours for thin films and 36 hours for the thick films. The conductivity of a polyaniline base film processed from NMP and doped with these acid solutions is 1 S/cm. The conductivity of a base film processed from NMP and 1% poly-co-dimethyl, aminopropyl siloxane (5% N content) was 50 S/cm.

2. Sulfonic Acid Doped Polyanilines

Polyaniline Base was dissolved in a solvent such as NMP or NMP/m-Cresol combinations, etc. from 1 to 5% solids. To this solution was added a dopant such as camphorsulfonic acid or acrylamidopropanesulfonic acid (previously reported in U.S. patent application Ser. No. 595,853 filed on Feb. 2, 1996). These solutions were used to spin-coat or solution cast films. In some experiments, the plasticizer such as the poly-co-dimethyl, aminopropyl siloxane in a solvent was added to the doped polyaniline solution. In certain other experiments, the plasticizer was first added to the pani base solution. The dopant was then added to the polyaniline solution containing the plasticizer.

The teaching of the following U.S. patent applications are incorporated herein by reference:

"CROSS-LINKED ELECTRICALLY CONDUCTIVE POLYMERS, PRECURSORS THEREOF AND APPLICATIONS THEREOF", application Ser. No. 595,853, filed Feb. 2, 1996;

"METHODS OF FABRICATION OF CROSS-LINKED ELECTRICALLY CONDUCTIVE POLYMERS AND PRECURSORS THEREOF", application Ser. No. 594,680, filed Feb. 2, 1996;

"DEAGGREGATED ELECTRICALLY CONDUCTIVE POLYMERS AND PRECURSORS THEREOF", application Ser. No. 370,127, filed Jan. 9, 1995; and "METHODS OF FABRICATION OR DEAGGREGATED ELECTRICALLY CONDUCTIVE POLYMERS AND PRECURSORS THEREOF", application Ser. No. 370,128, filed Jan. 9, 1995.

While the present invention has been shown and described with respect to a preferred embodiment, it will be understood that numerous changes, modifications, and improvements will occur to those skilled in the art without departing from the spirit and scope of the invention.

What is claimed is:

1. A method consisting of forming an admixture of a solvent selected from the group consisting of dimethyl sulfoxide (DMSO), dimethyl formamide (DMF), N-methylpyrrolidinone (NMP), tetramethyl urea, pyridine, m-cresol, phenol, dimethylacetamide, n-cyclohexylpyrrolidinone, 80% aqueous acetic acid, pyrrolidinone, N,N' dimethyl propyl urea, benzyl alcohol, and a combination of NMP/m-cresol;

an additive selected from the group consisting of adipic acid, azelaic acid, benzoic acid, citric acid, dimer acid, epoxy, fumaric acid, glycerol, lauric acid, linoleic acid, maleic acid, sebacic acid, stearic acid, succinic acid, terpentines, siloxanes, polysiloxanes, ethylene glycols, polyethylene glycols, polyesters, sucrose, myristic acid, oleic acid, palmitic acid, paraffin, phosphoric acid, phthalic acid, ricinoleic acid, tartaric acid, trimellitic acid, phosphonic acid, and polysilanes, poly-co-dimethyl propylamine siloxane said solvent in said admixture being different from said additive; and a polymer selected from the group consisting of a precursor to an electrically conductive polymer and an electrically conductive polymer, said precursor to said electrically conductive polymer being made electrically conductive by means of a doping reaction with an acid, said electrically conductive polymer and said doped polymer being selected from the group consisting of substituted and unsubstituted polyparaphenylene vinylenes, polyparaphenylenes, polyanilines, polythiophenes, polyazines, polyfurans, polypyrroles, polyselenophenes, poly-p-phenylene sulfides, polyacetylenes formed from soluble precursors, combinations thereof;

said electrically conductive polymer and said doped polymer being soluble in said solvent, said electrically conductive polymer and said doped polymer not being substantially soluble in said additive in the absence of said solvent, said additive provides local mobility to said polymer to allow regions of said polymer to associate with one another to achieve a crystalline state; and partly removing said solvent, substantially leaving said additive therein as remaining additive, said remaining additive provides local mobility to said polymer to achieve said crystalline state thereby comprising a polycrystalline material, said polycrystalline material is characterized by a degree of crystalline regions and a degree of amorphous regions, said degree of crystalline regions and said degree of amorphous regions are selected by selecting the composition of said additive, and the amount of said additive; forming a film from said admixture, said film possessing isotropic conductivity.

2. A method consisting of forming an admixture of an m-cresol solvent, a poly-co-dimethyl propylamine siloxane additive; and a polymer selected from the group consisting of a precursor to an electrically conductive polymer and an electrically conductive polymer, said precursor to said electrically conductive polymer being made electrically conductive by means of a doping reaction with an acid, said electrically conductive polymer and said doped polymer being polyaniline said electrically conductive polymer and said doped polymer being soluble in said solvent, said electrically conductive polymer and said doped polymer not being substantially soluble in said additive in the absence of said solvent, said additive provides local mobility to said polymer to allow regions of said polymer to associate with one another to achieve a crystalline state; and partly removing said m-cresol solvent, substantially leaving said poly-co-dimethyl propylamine siloxane additive therein as remaining additive, said remaining additive provides local mobility to said polyaniline polymer to achieve said crystalline state thereby comprising a polycrystalline material, said polycrystalline material is characterized by a degree of crystalline regions and a degree of amorphous regions, said degree of crystalline regions and said degree of amorphous regions are selected by selecting the composition of said additive, and the amount of said additive; forming a film from said admixture, said film possessing isotropic conductivity.

3. A method consisting of forming an admixture of:

an NMP/m-cresol solvent, a poly-co-dimethyl propylamine siloxane additive; and a polymer selected from the group consisting of a precursor to an electrically conductive polymer and an electrically conductive polymer, said precursor to said electrically conductive polymer being made electrically conductive by means of a doping reaction with an acid, said electrically conductive polymer and said doped polymer being polyaniline, said electrically conductive polymer and said doped polymer being soluble in said solvent, said electrically conductive polymer and said doped polymer not being substantially soluble in said additive in the absence of said solvent, said additive provides local mobility to said polymer to allow regions of said polymer to associate with one another to achieve a crystalline state; and partly removing said NMP/m-cresol solvent, substantially leaving said poly-co-dimethyl propylamine siloxane additive therein as remaining additive, said remaining additive provides local mobility to said polyaniline polymer to achieve said crystalline state thereby comprising a polycrystalline material, said polycrystalline material is characterized by a degree of crystalline regions and a degree of amorphous regions, said degree of crystalline regions and said degree of amorphous regions are selected by selecting the composition of said additive, and the amount of said additive; forming a film from said admixture, said film possessing isotropic conductivity.

* * * * *